United States Patent
Chhabbi et al.

(10) Patent No.: US 10,552,173 B2
(45) Date of Patent: Feb. 4, 2020

(54) METHODS AND APPARATUS TO CONFIGURE PARAMETERS OF A HIGH-SPEED INPUT-OUTPUT INTERFACE

(71) Applicant: Intel Corporation, Santa Clara, CA (US)

(72) Inventors: Shreesh Chhabbi, Bangalore (IN); Jabeena Gaibusab, Bangalore (IN)

(73) Assignee: INTEL CORPORATION, Santa Clara, CA (US)

(*) Notice: Subject to any disclaimer, the term of this patent is extended or adjusted under 35 U.S.C. 154(b) by 27 days.

(21) Appl. No.: 15/475,869

(22) Filed: Mar. 31, 2017

(65) Prior Publication Data
US 2018/0285125 A1    Oct. 4, 2018

(51) Int. Cl.
| | | |
|---|---|---|
| *G06F 9/00* | (2006.01) | |
| *G06F 9/24* | (2006.01) | |
| *G06F 15/177* | (2006.01) | |
| *G06F 9/4401* | (2018.01) | |
| *G06F 13/38* | (2006.01) | |

(52) U.S. Cl.
CPC ............ *G06F 9/4411* (2013.01); *G06F 13/38* (2013.01)

(58) Field of Classification Search
CPC ...................................................... G06F 9/44
See application file for complete search history.

(56) References Cited

U.S. PATENT DOCUMENTS

| | | | | |
|---|---|---|---|---|
| 2005/0041788 A1* | 2/2005 | Jan | ........................... | H04M 3/50 379/88.18 |
| 2007/0253305 A1* | 11/2007 | Watanabe | ............ | G11B 7/0941 369/94 |
| 2009/0164698 A1* | 6/2009 | Ji | ........................... | G06F 3/0613 711/100 |
| 2009/0315687 A1* | 12/2009 | Kanevsky | ............... | H04B 11/00 340/384.4 |
| 2012/0265331 A1* | 10/2012 | Chu | ........................ | G06F 17/50 700/103 |
| 2013/0179011 A1* | 7/2013 | Colby | ..................... | G01C 21/20 701/16 |
| 2015/0089164 A1* | 3/2015 | Ware | ......................... | G11O 5/02 711/149 |
| 2016/0072910 A1* | 3/2016 | Eicher | .................. | H04L 67/2842 709/213 |
| 2018/0088849 A1* | 3/2018 | Uduebho | ............... | G06F 3/0629 |
| 2018/0275696 A1* | 9/2018 | North | .................... | G05B 19/048 |

* cited by examiner

*Primary Examiner* — Mohammed H Rehman
(74) *Attorney, Agent, or Firm* — Hanley, Flight & Zimmerman, LLC (57) ABSTRACT

Methods, apparatus, systems and articles of manufacture for improved margining of high-speed input-output are disclosed. An example method includes determining, in response to a system initialization, whether to perform parameter optimization for an interface. In response to the determination to perform the parameter optimization, a search is performed for parameters that optimize performance of the interface using a particle swarm optimization algorithm. The parameters that optimize the performance are applied to the interface.

20 Claims, 6 Drawing Sheets

METHODS AND APPARATUS TO CONFIGURE PARAMETERS OF A HIGH-SPEED INPUT-OUTPUT INTERFACE

FIELD OF THE DISCLOSURE

This disclosure relates generally to High-Speed Input-Output (HSIO) Interfaces, and, more particularly, to methods and apparatus to configure parameters of an HSIO interface.

BACKGROUND

HSIO interfaces typically operate based on physical layer configuration parameters that control how the HSIO interface operates. Such configuration parameters include transmit voltage margin levels, receive voltage margin levels, etc. In practice, these parameters are configured once in a laboratory environment. However, varying environmental conditions may cause the parameters to no longer be the optimal parameters for the HSIO interface, potentially resulting in communications errors.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Many different types of High-Speed Input-Output (HSIO) interfaces exist. For example, an HSIO interface may be implemented as a Universal Serial Bus (USB) interface, a Serial Advanced Technology Attachment (SATA) interface, a Peripheral Component Interconnect Express (PCIe) interface, etc. HSIO interfaces are used in many different types of computing devices such as, for example, servers, personal computers, laptops, tablets, and/or any other type of computing devices.

HSIO interfaces accept parameters that control their operation at the physical layer. For example, an HSIO interface might accept an input to control tap coefficient values, gain values, etc. By varying the inputs, different margins for voltage and phase operational characteristics can be produced. Moreover, other operational characteristics, such as bit error rate (BER), can be used to assess quality of the HSIO connectivity based on the input parameters. Such configuration parameters are traditionally determined in a laboratory environment (e.g., under ideal conditions), and stored in a memory of the computing device. Such configuration parameters are read from the memory and applied to the HSIO interface during a boot process. Unfortunately, in the real world, devices are not always operated under ideal conditions. Sensitivity in the physical layer to environmental conditions can cause communication failures at the HSIO interface. As a result, HSIO parameters that were determined at a first point in time might no longer result in optimal communications at a later point in time.

In example approaches disclosed herein, optimization of HSIO parameters is performed. During a boot procedure, the computing system attempts to optimize the HSIO parameters used by the HSIO interface. In some examples, the HSIO interface may accept m different parameters, each having n different possible values. The number of potential combinations of parameters can be represented as $m^n$ potential combinations of parameters. For example, if there were five different parameters having ten different possible inputs per parameter, there are $5^{10}$ (i.e., approximately 9.8 million) potential combinations of parameters.

While, in theory, each potential combination of parameters should be tested to determine which combination is the optimal combination, such testing may take an unacceptably long period of time when booting a device by an end user (e.g., a consumer). If, for example, each potential combination were to take one millisecond to test, the above example would require approximately 2.7 hours to search all 9.8 million potential combinations of parameters. While such an amount of time may be practical in a laboratory environment, it is likely unacceptable in an end-user environment. To reduce the duration of the search, example approaches disclosed herein utilize a particle swarm optimization algorithm to identify the optimal combination of parameters.

Particle swarm optimization is a computational technique that optimizes a set of inputs to a solution to find an optimal output. Each potential solution, which is referred to as a particle, represents a point within the potential solution space. Each particle is moved about the search space based on factors such as, for example, a current position of the particle, a velocity of the particle, a best-known position of the particle (e.g., the position of the particle that produced the best output), a best-known position of all of the particles (e.g., a global best position), etc. Because each particle is moved based on the best-known position of all of the particles (sometimes referred to as a social behavior), the particles are expected to move towards the best solution(s). The particles are moved until an acceptable combination of parameters is identified. In some examples, the particles are moved until the global best-known position (and its corresponding input combination of parameters) meets a threshold value. In some examples, the particles are moved a threshold number of iterations.

Utilizing the particle swarm optimization approaches disclosed herein reduces the amount of candidate combinations of parameters to be tested and, as a result, reduces an amount of time to identify the optimal combination of parameters. For example, if twenty particles were used, taking approximately one hundred iterations to arrive at an optimal combination of parameters, such search would take approximately two seconds (as compared to 2.7 hours to test each of the candidate combinations of parameters).

Figure 1:
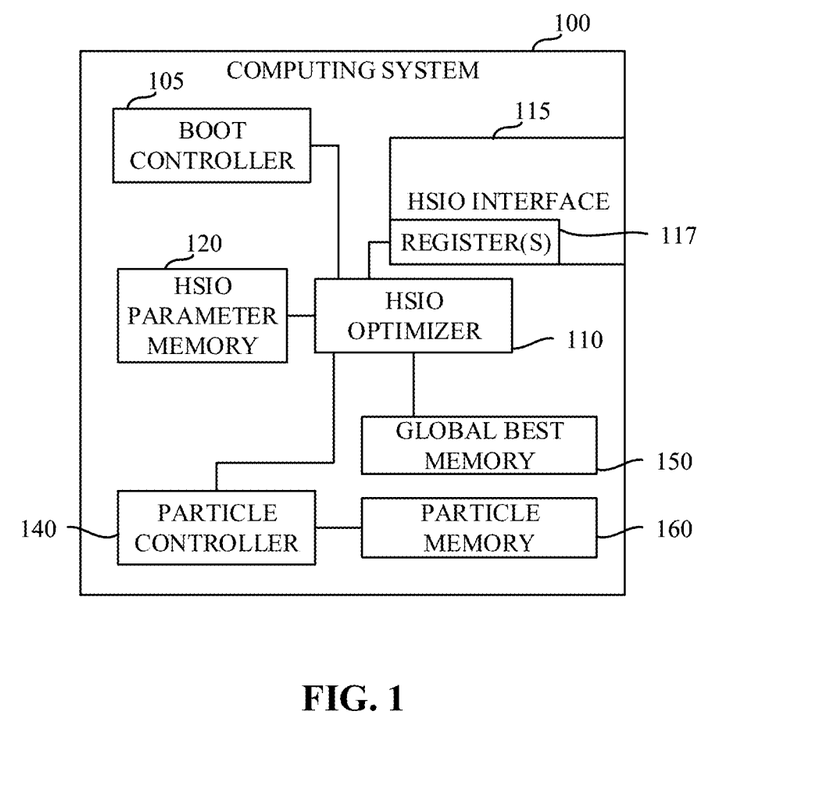
FIG. 1 is a block diagram of an example computing system constructed in accordance with the teachings of this disclosure to configure parameters of a high-speed input-output interface.

FIG. 1 is a block diagram of an example computing system 100 constructed in accordance with the teachings of this disclosure to configure parameters of a high-speed input-output interface. The example computing system 100 of the illustrated example of FIG. 1 includes a boot controller 105, and HSIO optimizer 110, and HSIO interface 115, registers 117, and HSIO parameter memory 120, a particle controller 140, a global best memory 150, and a particle memory 160.

The example boot controller 105 of the illustrated example of FIG. 1 controls boot procedures of the computing system 110. In examples disclosed herein, the example boot controller 105 determines whether an optimization procedure is to be performed by the HSIO optimizer 110.

The example HSIO optimizer 110 of the illustrated example of FIG. 1 searches for parameters that optimize the performance of the HSIO interface 115. In examples disclosed herein, the example HSIO optimizer 110 implements a particle swarm optimization algorithm to identify the parameters that optimize the performance of the HSIO interface 115. In examples disclosed herein, the example HSIO optimizer 110 interacts with the HSIO interface 115 using register locations 117 provided by the HSIO interface 115. In examples disclosed herein, the example HSIO optimizer 110 writes the parameters to first register locations, and reads performance characteristics from second register locations. However, any other way of interacting with an HSIO interface may additionally or alternatively be used.

The example HSIO interface 115 of the illustrated example of FIG. 1 enables the computing system to communicate using high-speed input-output communications with other devices. The example HSIO interface 115 may implement, for example, a Universal Serial Bus (USB) interface, a Serial Advanced Technology Attachment (SATA) interface, a Peripheral Component Interconnect Express (PCIe) interface, etc. In some examples, the HSIO interface 115 enables communications with devices that are external to the computing system 100 (e.g., external peripherals such as universal serial bus devices, display devices, etc.). In some examples, the HSIO interface 115 enables communications with devices that are internal to the computing system (e.g., internal devices such as hard drives). As noted above, performance of the communications can be affected by many different variables such as, for example, environmental conditions (e.g., electromagnetic radiation), changes in the operational characteristics of the computing system (e.g., components no longer being within an expected tolerance, different communication cables being used, etc.), etc.

The example HSIO parameter memory 120 of the illustrated example of FIG. 1 may be implemented by any device for storing data such as, for example, flash memory, magnetic media, optical media, etc. Furthermore, the data stored in the example HSIO parameter memory 120 may be in any format such as, for example, binary data, comma separated data, tab delimited data, structured query language (SQL) structures, etc. While, in the illustrated example, the example HSIO parameter memory 120 is illustrated as a single memory element, the example HSIO parameter memory 120 may be implemented by any number and/or type(s) of memory elements(s). The example HSIO parameter memory 120 stores HSIO parameters selected by the HSIO optimizer 110. When booting the computing system, the parameters stored in the example HSIO parameter memory 120 are applied to the HSIO interface 115.

The example particle controller 140 of the illustrated example of FIG. 1 controls the parameters of each particle in the swarm for the particle swarm optimization procedure. In examples disclosed herein, the example boot controller 105 updates values of the parameters based on the values that resulted in a global best score, values that resulted in a best score for the particle, prior values of the particle, etc.

The example global best memory 150 of the illustrated example of FIG. 1 may be implemented by any device for storing data such as, for example, flash memory, magnetic media, optical media, etc. Furthermore, the data stored in the example global best memory 150 may be in any format such as, for example, binary data, comma separated data, tab delimited data, structured query language (SQL) structures, etc. While, in the illustrated example, the example global best memory 150 is illustrated as a single memory element, the example global best memory 150 may be implemented by any number and/or type(s) of memory elements(s). During optimization procedures, the example HSIO optimizer 110 stores parameters and/or a score associated with a global best achieved by the particle swarm optimization procedure.

The example particle memory 160 of the illustrated example of FIG. 1 may be implemented by any device for storing data such as, for example, flash memory, magnetic media, optical media, etc. Furthermore, the data stored in the example particle memory 160 may be in any format such as, for example, binary data, comma separated data, tab delimited data, structured query language (SQL) structures, etc. While, in the illustrated example, the example particle memory 160 is illustrated as a single memory element, the example particle memory 160 may be implemented by any number and/or type(s) of memory elements(s). During optimization procedures, the example particle controller 140 stores information for each of the particles used in the particle swarm optimization procedure in the particle memory 160. In the illustrated example of FIG. 1, each of the HSIO parameter memory 120, the global best memory 150, and the particle memory 160 are shown as separate memory elements. However, in some examples, the HSIO parameter memory 120, the global best memory 150, and the particle memory 160 are implemented in a same memory element.

While an example manner of implementing the computing system 100 is illustrated in FIG. 1, one or more of the elements, processes and/or devices illustrated in FIG. 1 may be combined, divided, re-arranged, omitted, eliminated and/or implemented in any other way. Further, the example boot controller 105, the example HSIO optimizer 110, the example HSIO interface 115, the example HSIO parameter memory 120, the example particle controller 140, the example global best memory 150, the example particle memory 160, and/or, more generally, the example computing system 100 of FIG. 1 may be implemented by hardware, software, firmware and/or any combination of hardware, software and/or firmware. Thus, for example, any of the example boot controller 105, the example HSIO optimizer 110, the example HSIO interface 115, the example HSIO parameter memory 120, the example particle controller 140, the example global best memory 150, the example particle memory 160, and/or, more generally, the example computing system 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example boot controller 105, the example HSIO optimizer 110, the example HSIO interface 115, the example HSIO parameter memory 120, the example particle controller 140, the example global best memory 150, the example particle memory 160, and/or, more generally, the example computing system 100 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example computing system 100 of FIG. 1 may include one or more elements, processes and/or devices in addition to, or instead of, those illustrated in FIG. 1, and/or may include more than one of any or all of the illustrated elements, processes and devices.

Figure 2:
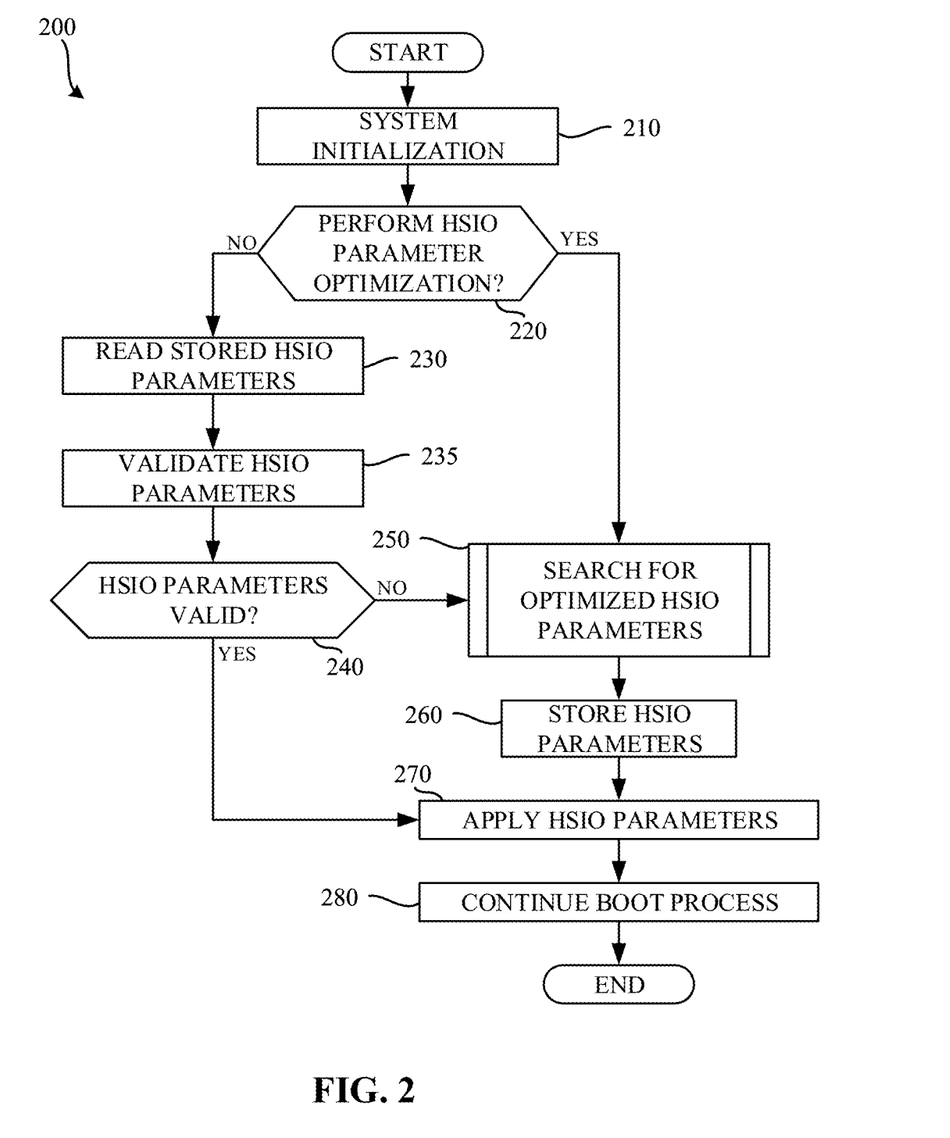
FIG. 2 is a flowchart representative of machine-readable instructions which, when executed, cause the example computing system of FIG. 1 to perform optimization of HSIO parameters as part of a boot procedure.
Figure 3A:
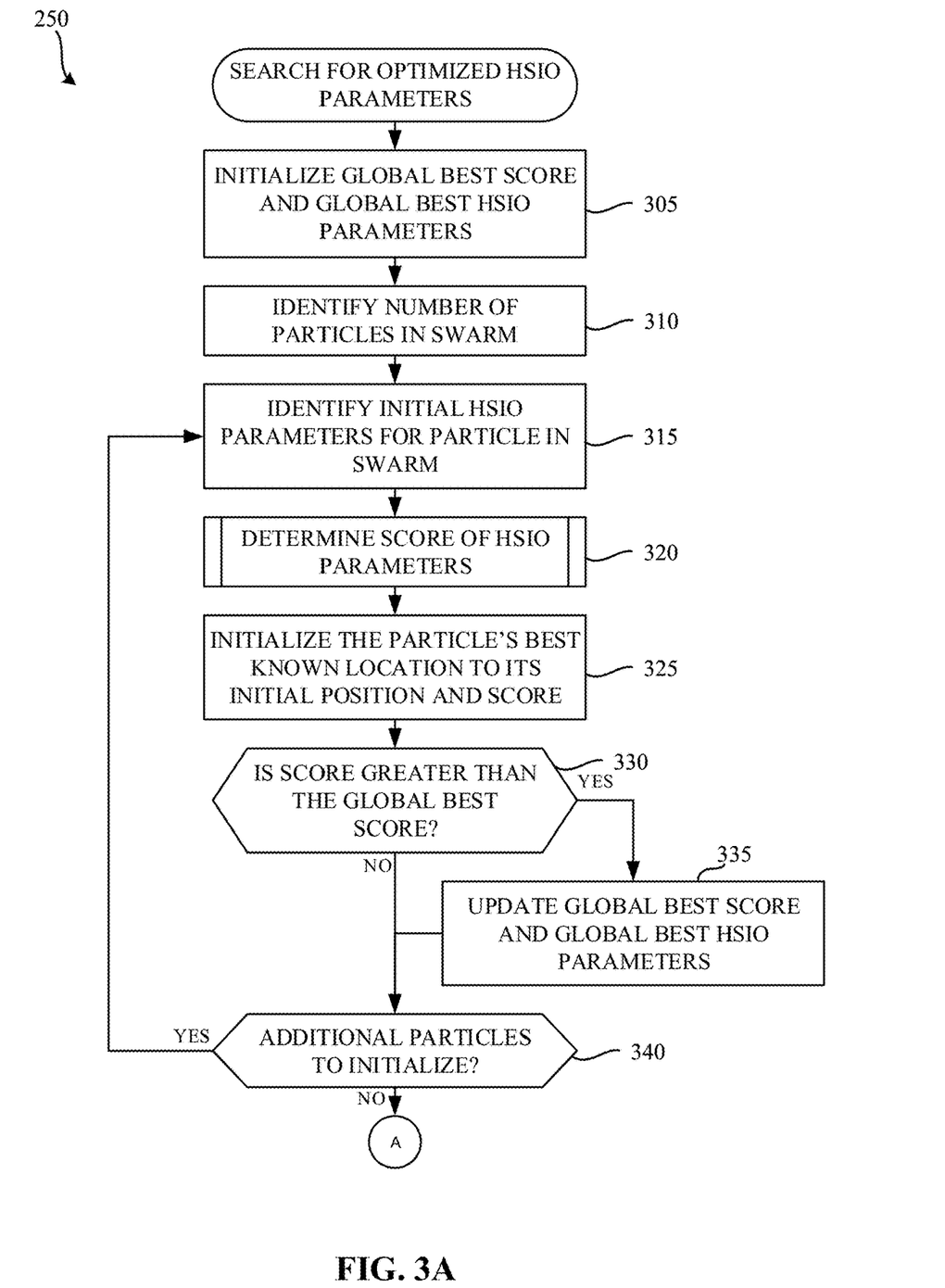
FIGS. 3A and 3B are a flowchart representative of machine-readable instructions which, when executed, cause the example computing system of FIG. 1 to utilize a particle swarm optimization approach to select the optimized HSIO parameters.
Figure 3B:
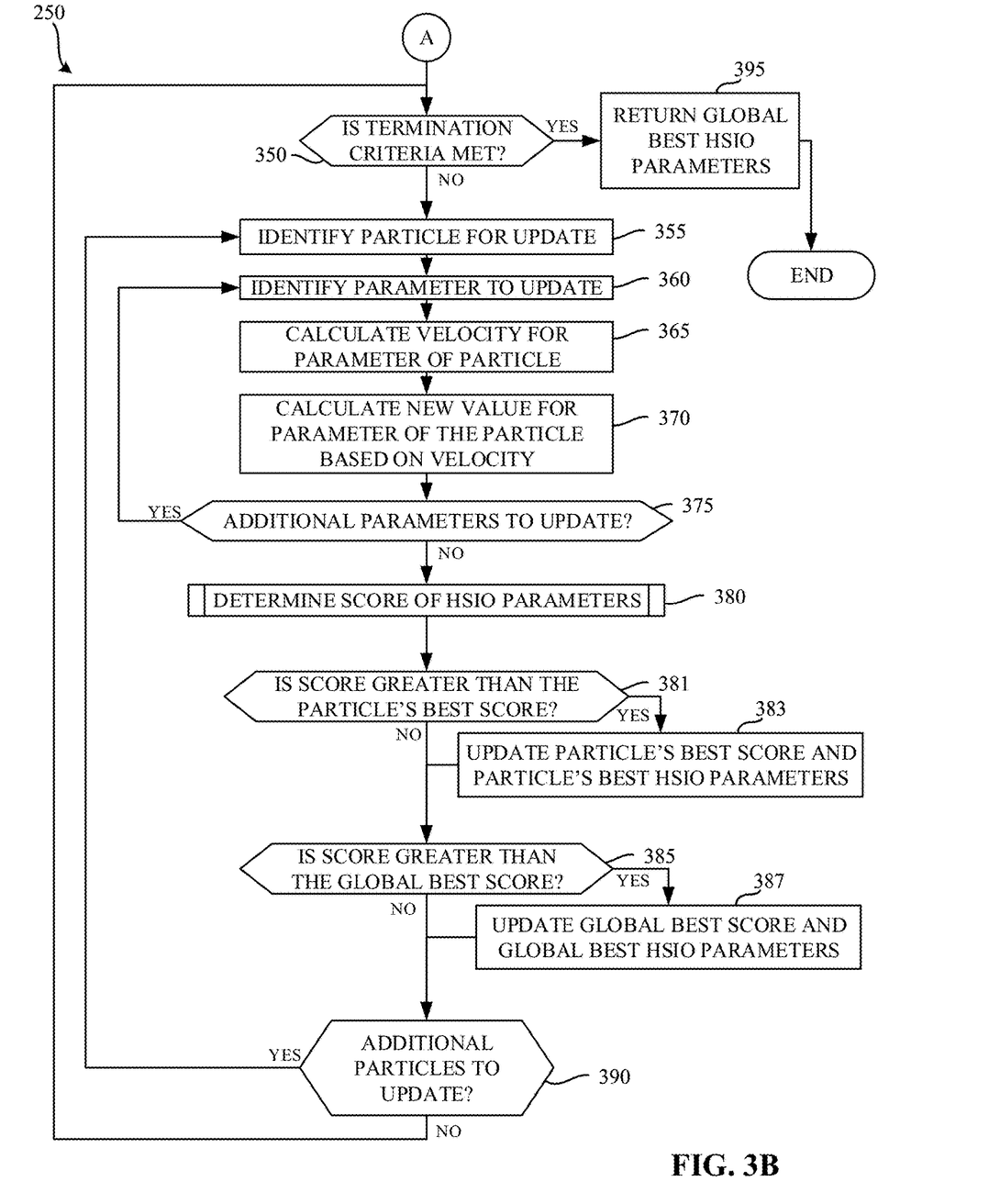

Flowcharts representative of example machine readable instructions for implementing the example computing system 100 of FIG. 1 are shown in FIGS. 2, 3A, 3B, and/or 4. In these examples, the machine readable instructions comprise a program(s) for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart(s) illustrated in FIGS. 2, 3A, 3B, and/or 4, many other methods of implementing the example computing system 100 may alternatively be used. For example, the order of execution of the blocks may be changed, and/or some of the blocks described may be changed, eliminated, or combined.

As mentioned above, the example processes of FIGS. 2, 3,A, 3B, and/or 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 2, 3,A, 3B, and/or 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 2 is a flowchart representative of machine-readable instructions 200 which, when executed, cause the example computing system 100 of FIG. 1 to perform optimization of HSIO parameters as part of a boot procedure. The example process 200 of the illustrated example of FIG. 2 begins when the example computing system 100 is booted. While in examples disclosed herein, the procedure 200 of the illustrated example of FIG. 2 is performed at boot time, in some examples, the procedure of FIG. 2 may be performed at any other time such as, for example, while the computer system 100 is already booted and/or executing an operating system.

The example process 200 of the illustrated example of FIG. 2 begins when the example boot controller 105 initializes the system (block 210). In examples disclosed herein, the boot controller 105 initializes a processor, memory, and/or input output devices (e.g., the HSIO interface 115) of the example computing system 100. The example boot controller 105 determines whether HSIO parameter optimization should be performed (block 220). In examples disclosed herein, the example boot controller 105 determines whether to perform HSIO parameter optimization by reading an instruction from memory. In some examples, the instruction may be written to the memory while the system is in an operating state. For example, the instruction may be written based on input received from a user during presentation of a BIOS interface. In this manner, the boot controller 105 can identify, upon a subsequent reboot, that HSIO parameter optimization is to be performed. In some examples, the instruction is cleared from the memory upon completion of the HSIO parameter optimization.

If the example boot controller 105 determines that HSIO parameter optimization is not to be performed (e.g., block 220 returns a result of NO), the example HSIO optimizer 110 reads HSIO parameters stored in the HSIO parameter memory 120 (block 230). In some examples, the example HSIO optimizer 110 validates the parameters read from the HSIO parameter memory 120 (block 235). In some examples, the HSIO optimizer 110 validates the parameters by calculating a hash and comparing the hash (or portions thereof) to a stored value (e.g., a previously stored hash value). In some examples, the HSIO optimizer 110 validates the parameters by determining whether the parameters are each within respective threshold ranges. In some examples, the HSIO optimizer validates the parameters by applying the parameters to the HSIO interface and determining whether the HSIO interface operates correctly and/or within an acceptable performance range. If the example HSIO optimizer 110 identifies that the parameters are not valid (e.g., block 240 returns a result of NO), the example HSIO optimizer 110 searches for optimized HSIO parameters (block 250). An example approach for searching for optimized HSIO parameters is described in further detail in connection with FIGS. 3A and 3B.

Returning to block 220, if the example boot controller 105 identifies that HSIO parameter optimization is to be performed (e.g., block 220 returns a result of YES) the example HSIO optimizer 110 searches for optimized HSIO parameters (block 250). The example HSIO optimizer 110 stores the optimized HSIO parameters in the HSIO parameter memory 120 (block 260).

Upon storing the optimized HSIO parameters (block 260) or the identifying that the stored HSIO parameters are valid (e.g., block 240 returning a result of YES), the example HSIO optimizer 110 applies the HSIO parameters to the HSIO interface 115 (block 270). In examples disclosed herein, the HSIO optimizer 110 applies parameters to the HSIO interface 115 by writing the parameters to corresponding register locations 117 hosted by the HSIO interface 115. However, any other past, present, and/or future approach to applying parameters to an HSIO interface may additionally or alternatively be used.

The example boot controller 105 then continues the boot process to boot the computing system 100 (block 280). In some examples, the example computing system 100 may include multiple HSIO interfaces. In such an example, the example process of blocks 220 through 270 may be performed (e.g., repeated) in connection with each of the HSIO interfaces. The example process 200 of the illustrated example of FIG. 2 then terminates.

FIGS. 3A and 3B are a flowchart representative of machine-readable instructions 250 which, when executed, cause the example computing system 100 of FIG. 1 to utilize a particle swarm optimization approach to select the optimized HSIO parameters. FIG. 3A represents an initialization phase of the particle swarm optimization algorithm, while FIG. 3B represents a search phase of the particle swarm optimization algorithm.

The example process 250 of the illustrated example of FIGS. 3A and 3B begins when the example HSIO optimizer 110 initializes a global best score and global best HSIO parameters in the global best memory 150 (block 305). In the illustrated example of FIG. 3A, the global best score and global best HSIO parameters are initialized to zero. However, in some examples, the global best HSIO parameters may be initialized based on information stored in the example HSIO parameter memory 120 (e.g., a previously stored selected HSIO parameters and/or their corresponding resultant score).

The example HSIO optimizer 110 identifies a number of particles to be used in the particle swarm optimization procedure (block 310). In examples disclosed herein, the example HSIO optimizer 110 utilizes 20 particles. However, any other number of particles may additionally or alternatively be used.

The example particle controller 140 identifies initial HSIO parameters a particle in swarm (block 315). In examples disclosed herein, the example particle controller 140 randomly selects HSIO parameters for the particle. However, any other approach to identifying initial parameters may additionally or alternatively be used. Using a random approach to initializing each parameter of each particle ensures that the particles are evenly distributed across the search space. In some examples, threshold values corresponding to each of the parameters are used to guide the initialization of the parameters.

The example HSIO optimizer 110 then identifies objective scores for the set of HSIO parameters for the particle (block 320). An example approach for determining an objective score based on the parameters of the particle is described in further detail in connection with FIG. 4. In short, the example HSIO optimizer 110 calculates an objective score that represents the performance of the HSIO interface when using the given HSIO parameters.

The example particle controller 140 then initializes the particle's best-known location to its initial position and the score calculated by the example HSIO optimizer 110 (block 325). The example particle controller 140 stores the particle's best-known location and score in the example particle memory 160. The example HSIO optimizer 110 determines whether the score calculated in connection with block 320 for the particle is greater than the global best score stored in the global best memory 150 (block 330). If the score for the particle is greater than the global best score (e.g., block 330 returns result of YES), the example HSIO optimizer 110 updates the global best score and the global best HSIO parameters in the global best memory 150 (block 335). If the score is not greater than the global best score (e.g., block 330 returns result of NO), the global best score is not updated, and the example HSIO optimizer 110 determines whether there are additional particles to initialize (block 340). If the example HSIO optimizer 110 identifies that there are initial particles to initialize (e.g., block 340 returns a result of YES), the example process of blocks 315 through 340 is repeated for each of the particles in the swarm. If there are no additional particles to initialize (e.g., block 340 returns a result of NO), the example process proceeds from the initialization phase (of FIG. 3A) into the searching phase (of FIG. 3B).

In the example searching phase, the example HSIO optimizer 110 determines whether a termination criteria is met (block 350). In examples disclosed herein the termination criteria requires that in threshold number of iterations of the search phase be performed before the global best parameters are selected. However, any other approach to determining whether a termination criteria is met may additionally alternatively be used. For example, in the example HSIO optimizer may determine that a termination criteria has been met when the global best score meets or exceeds a desired performance threshold, the example HSIO optimizer 110 may determine that the termination criteria has been met when a threshold amount of time has elapsed during the search phase, etc.

If the example HSIO optimizer 110 identifies that the termination criteria has not been met (e.g., block 350 returns a result of NO), the example HSIO optimizer 110 identifies a particle to be updated (block 355). In examples disclosed herein, each of the particles are updated sequentially. However, the particles may be selected for update in any other fashion. The example particle controller 140 identifies a parameter associated with the particle to be updated (block 360). In some examples, each of the particles may have multiple parameters. The example particle controller 140 calculates a velocity for the selected parameter of the selected particle (block 365). The velocity of the selected parameter is calculated using Equation 1, below:

$$v(t+1) = w^* v(t) + C_1 R_1 (P_{best} - P_{curr}) + C_2 R_2 (G_{best} - P_{curr}) \quad \text{Equation 1}$$

In the illustrated example of Equation 1, above, v(t) represents the current velocity of the particle and v(t+1) represents the new calculated velocity of the parameter. w represents an inertial component that is applied to the current velocity of the parameter, which ensures that particles move inertially in a same direction. In examples disclosed herein, w is typically set to a value that is greater than or equal to 0.8 and is less than or equal to 1.2. $P_{best}$ represents the best value of the parameter when the particle achieved its best-known position (e.g., the position that resulted in the greatest score for the given particle). $P_{curr}$ represents the current value of the parameter for the particle. $G_{best}$ represents the value of the parameter that resulted in the global best score.

$C_1$ and $C_2$ represent learning factors, and control the amount of effect that the differences represented by ($P_{best} - P_{curr}$) (e.g., the difference between the best value of the parameter for the particle and the current value of the parameter for the particle) and ($G_{best} - P_{curr}$) (e.g., the difference between the value of the parameter that resulted in the global best score and the current value of the parameter for the particle). In examples disclosed herein, $C_1$ and $C_2$ are typically set to values that are greater than or equal to zero and less than or equal to two. In examples disclosed herein, the values for $C_1$ and $C_2$ are different from each other. However, in some examples, the values for $C_1$ and $C_2$ may be the same.

$R_1$ and $R_2$ are random values to introduce randomness to the velocity update. In examples disclosed herein, $R_1$ and $R_2$ are typically set to values that are greater than or equal to zero and less than or equal to one. In examples disclosed herein, the values for $R_1$ and $R_2$ are different from each other. However, in some examples, the values for $R_1$ and $R_2$ may be the same.

Using Equation 1, above, the example particle controller 140 calculates a velocity of the parameter for the given particle (block 365). Using the calculated velocity, the example particle controller 140 calculates a new value for the selected parameter of the selected particle (block 370). The example particle controller 140 then identifies whether there are any additional parameters to be updated (block 375). If there are additional parameters to be updated (e.g., block 375 returns result of YES), the example process of blocks 360 through 375 is repeated until no additional parameters exist to be updated (e.g., until block 375 returns a result of NO).

Once block 375 returns a result of NO, the example particle controller 140 has updated the parameters of the particle based on the prior parameter(s) of the particle and/or global parameters resulting in a global best score. The example HSIO optimizer 110 determines a score using the updated parameters for the particle (block 380). In the illustrated example of FIG. 3B, the determination of the score (block 380) is performed in the same manner as the determination of the score in (block 320). As noted above, an example approach to determining an objective score given a set of parameters is disclosed in connection with FIG. 4.

The example HSIO optimizer 110 determines whether the score calculated in connection with block 380 for the particle is greater than the particle's best score (stored in the particle memory 160) (block 381). If the score for the current parameters of the particle is greater than the particle's best score (e.g., block 381 returns result of YES), the example HSIO optimizer 110 updates the particle's best score and the particle's best HSIO parameters in the particle memory 160 (block 383). If the score is not greater than the particle's best score (e.g., block 383 returns result of NO), the global best score is not updated.

The example HSIO optimizer 110 determines whether the score calculated in connection with block 380 for the particle is greater than the global best score (stored in the global best memory 150). If the score for the current parameters of the particle is greater than the global best score (e.g., block 385 returns result of YES), the example HSIO optimizer 110 updates the global best score and the global best HSIO parameters in the global best memory 150 (block 387). If the score is not greater than the global best score (e.g., block 385 returns result of NO), the global best score is not updated, and the example HSIO optimizer 110 determines whether there are additional particles to update (block 390). If the example HSIO optimizer 110 identifies that there are additional particles to update (e.g., block 390 returns a result of YES), the example process of blocks 335 through 390 is repeated until there are not additional particles to update (e.g., the process is performed for each of the particles in the swarm). If there are no additional particles to update (e.g., block 390 returns a result of NO, indicating that all particles have been updated), the example HSIO optimizer determines whether the termination criteria has been met (block 350). The example process of blocks 350 through 390 is repeated until the termination criteria has been met (e.g., until block 350 returns a result of YES). Once the termination criteria has been met, the example HSIO optimizer 110 returns the parameters that resulted in the global best score (block 395). The example process of FIGS. 3A and 3B then terminates.

Figure 4:
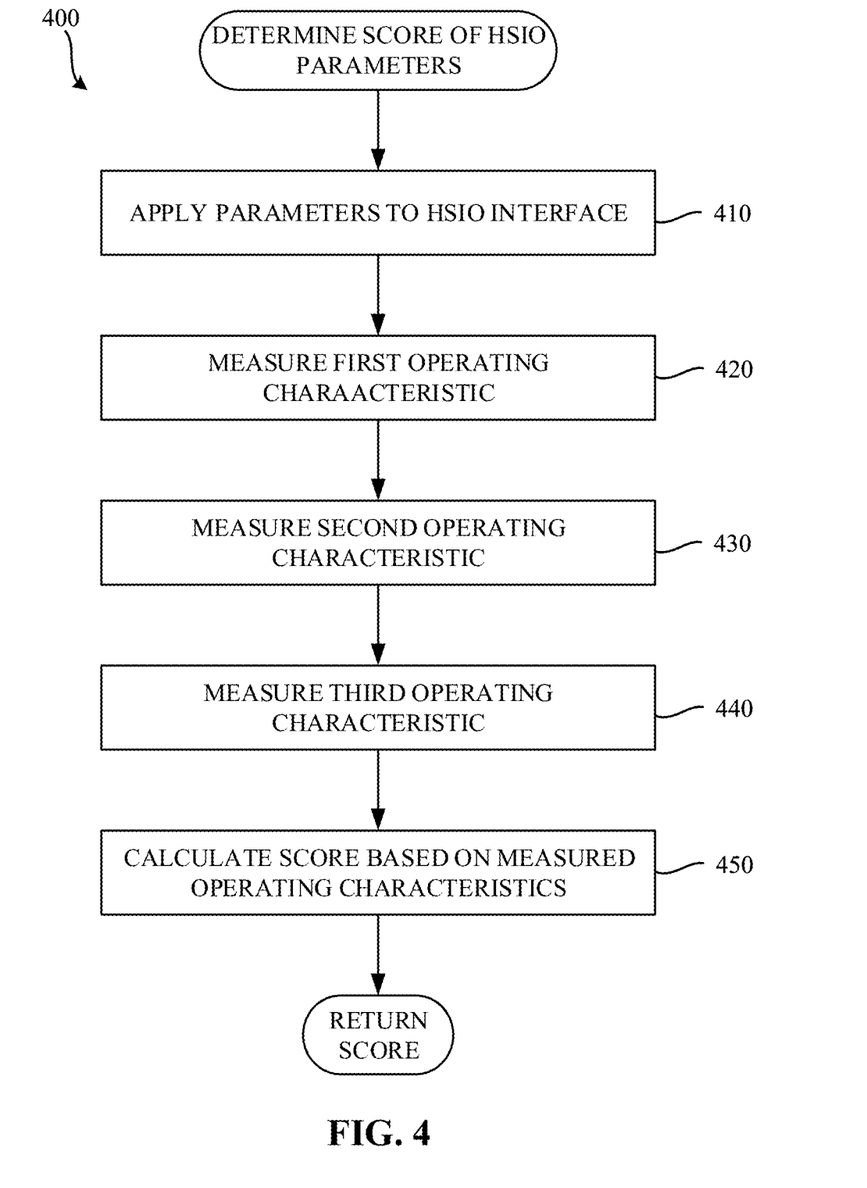
FIG. 4 is a flowchart representative of machine-readable instructions which, when executed, cause the example computing system of FIG. 1 to determine a score for a given set of HSIO parameters.

FIG. 4 is a flowchart representative of machine-readable instructions 400 which, when executed, cause the example computing system 100 of FIG. 1 to determine a score for a given set of HSIO parameters. The example process 400 of the illustrated example of FIG. 4 begins when the example HSIO optimizer applies the parameters to the HSIO interface 115 (block 410). In examples disclosed herein, the parameters are applied to the HSIO interface 115 by writing the parameters into one or more register locations 117 hosted by the HSIO interface 115. However, the parameters may be applied to the HSIO interface 115 and any other fashion.

The example HSIO optimizer 110 measures a first operating characteristic of the HSIO interface 115 (block 420). The example HSIO interface 110 measures a second operating characteristic of the example HSIO interface 115 (block 430). The example HSIO optimizer 115 measures a third operating characteristic of the HSIO interface 115 (block 440). In examples disclosed herein, the operational characteristics of the HSIO interface are measured by reading and output value stored in a register location hosted by the HSIO interface 115. In examples disclosed herein, the first operational characteristic represents a voltage margin of the HSIO interface based on the set parameters. In examples disclosed herein, the second operational characteristic represents a phase margin of the HSIO interface 115 based on the set parameters. In examples disclosed herein, the third operational characteristic represents a bit error rate (BER) experienced by the HSIO interface when using the set parameters. However, any other operational characteristic of the HSIO interface may additionally or alternatively be used.

Using the measured operating characteristics, the example HSIO optimizer 110 calculates an objective score (block 450). In examples disclosed herein, the objective score is calculated using the example Equation 2, below:

$$\text{Score} = (\text{Margin}_{Voltage} + \text{Margin}_{phase}) - \text{BER} \qquad \text{Equation 2}$$

In the illustrated example of Equation 2, above, voltage and phase margin values are added together, and the resultant BER is subtracted to form the score. In some examples, portions of example Equation 2 may be scaled to emphasize and/or de-emphasize particular input variables when calculating the score. For example:

$$\text{Score} = K^*(S^*(\text{Margin}_{voltage} + \text{Margin}_{phase}) - \text{BER}) \qquad \text{Equation 3}$$

In the illustrated example of Equation 3, scalar values K and S can be used to scale the results of the combinations of the operational characteristics measured by the HSIO optimizer 110. While in the illustrated example of FIG. 4, three operational characteristics are used to determine the score, any other characteristics may additionally or alternatively be used. Upon calculation of the score, the score is returned (see blocks 320 and/or 380 of FIG. 3A and/or 3B) and the example process 400 of FIG. 4 terminates.

Figure 5:
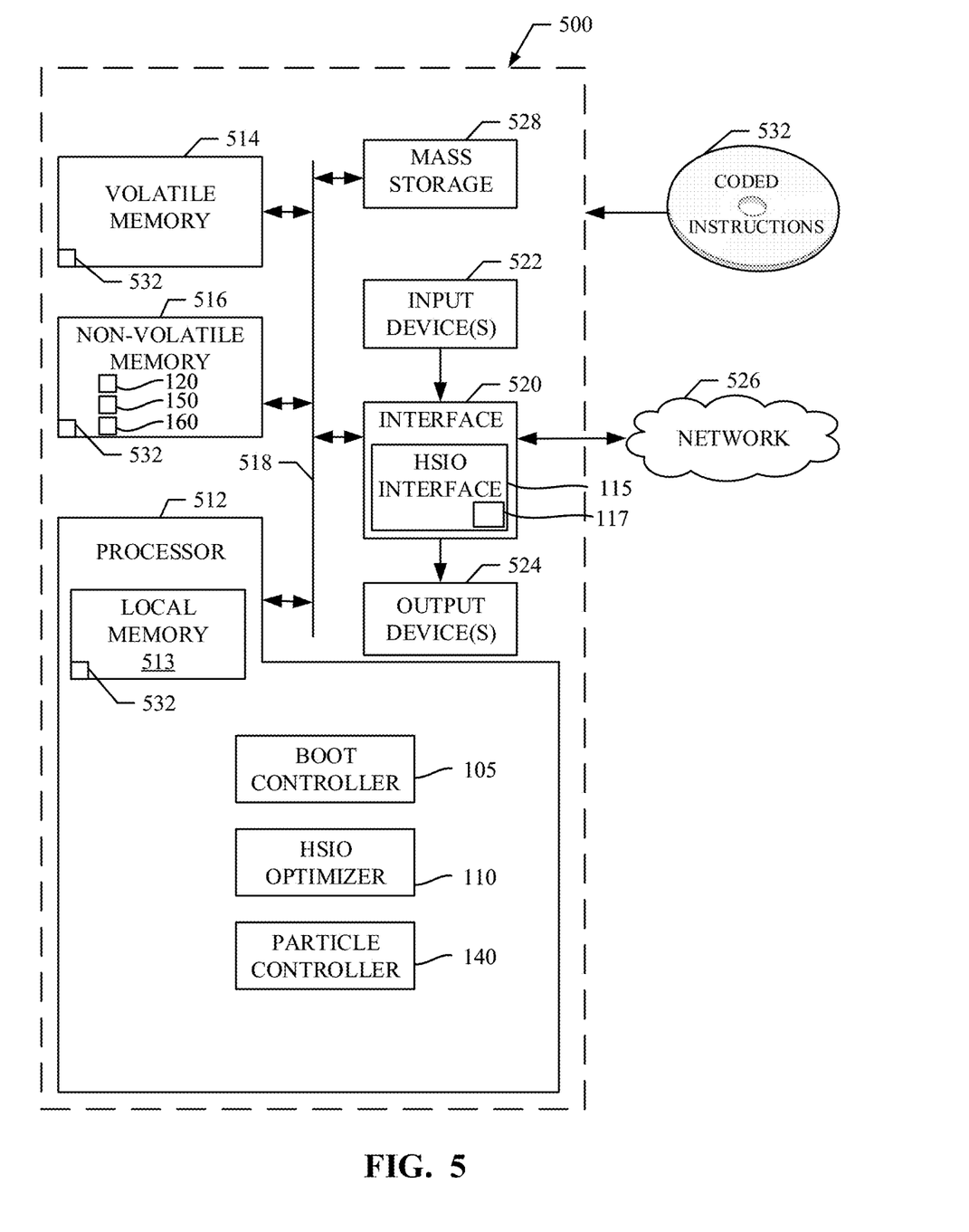
FIG. 5 is a block diagram of an example processor platform capable of executing the instructions of FIGS. 2, 3A, 3B, and/or 4 to implement the example computing system of FIG. 1.

FIG. 5 is a block diagram of an example processor platform 500 capable of executing the instructions of FIGS. 2, 3A, 3B, and/or 4 to implement the computing system of FIG. 1. The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache) and executes instructions to implement the example boot controller 105, the example HSIO optimizer 110, and/or the example particle controller 140. The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller. In the illustrated example of FIG. 5, the non-volatile memory 516 implements the example HSIO parameter memory 120, the example global best memory 150, and/or the example particle memory 160.

The processor platform 500 of the illustrated example also includes an interface circuit 520. The interface circuit 520 may be implemented by any type of interface standard, such as an Ethernet interface, a universal serial bus (USB), and/or a PCI express interface. In the illustrated example of FIG. 5, the example interface circuit 520 implements the example HSIO interface 115.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIGS. 2, 3A, 3B, and/or 4 may be stored in the mass storage device 528, in the volatile memory 514, in the non-volatile memory 516, and/or on a removable tangible computer readable storage medium such as a CD or DVD.

From the foregoing, it will be appreciated that the above disclosed methods, apparatus and articles of manufacture enable optimal HSIO parameters to be identified in a reduced amount of time as compared to performing a brute-force search of all combinations of parameters. In existing approaches, identification of the optimal parameters is performed in a controlled laboratory environment (e.g., not in a user environment). Identification of such optimal parameters can take a long time and is typically performed upon each iteration of a firmware update. Utilizing approaches disclosed herein, HSIO parameter optimization can be quickly performed in the field (e.g., in a user environment). Utilizing the approaches disclosed herein also enables the computing system to adapt to changing environmental conditions. For example, whereas the controlled laboratory environment might identify a first set of parameters, when the device is used in a user environment (which might involve electromagnetic interference), a second set of parameters different from the first set of parameters may be found to be optimal.

Example 1 includes an apparatus to configure parameters of an input-output interface, the apparatus comprising a boot controller to determine, in response to a system initialization, whether to perform parameter optimization for an interface, and a controller to, in response to the determination to perform the parameter optimization, search for parameters that optimize performance of the interface using a particle swarm optimization algorithm, and apply the parameters that optimize the performance to the interface.

Example 2 includes the apparatus as of example 1, wherein the controller is to optimize the parameters based on a voltage margin, a phase margin, and a bit error rate read from the interface.

Example 3 includes the apparatus of any one of examples 1-2, wherein the controller is further to store the parameters that optimize the performance to a memory.

Example 4 includes the apparatus of any one of examples 1-3, wherein the determination of whether to perform the parameter optimization is based on an instruction stored in a memory, the instruction stored in the memory based on an input received from a user.

Example 5 includes the apparatus of any one of examples 1-4, wherein the determination of whether to perform the parameter optimization includes validating the parameters stored in a memory.

Example 6 includes the apparatus of any one of examples 1-5, wherein the controller is to write the parameters that optimize the performance to a register of the interface.

Example 7 includes a method for configuring parameters of an input-output interface, the method comprising determining, by executing an instruction with a processor and in response to a system initialization, whether to perform parameter optimization for an interface, in response to the determination to perform the parameter optimization, searching, by executing an instruction with the processor, for parameters that optimize performance of the interface using a particle swarm optimization algorithm, and applying the parameters that optimize the performance to the high-speed input-output interface.

Example 8 includes the method as of example 7, wherein the particle swarm optimization algorithm optimizes the parameters based on a voltage margin, a phase margin, and a bit error rate.

Example 9 includes the method of any one of examples 7-8, further including storing the parameters that optimize the performance to a memory.

Example 10 includes the method of any one of examples 7-9, wherein the determination of whether to perform the parameter optimization is based on an instruction stored in memory.

Example 11 includes the method of example 10, wherein the instruction is stored based on an input received from a user.

Example 12 includes the method of any one of examples 7-11, wherein the determination of whether to perform the parameter optimization includes validating the parameters stored in a memory.

Example 13 includes the method of any one of examples 7-12, wherein the parameters that optimize the performance are applied to the interface by writing the parameters to a register of the interface.

Example 14 includes at least one tangible machine readable storage medium comprising instructions which, when executed, cause a processor to at least determine, in response to a system initialization, whether to perform parameter optimization for an interface, in response to the determination to perform the parameter optimization, search for parameters that optimize performance of the interface using a particle swarm optimization algorithm, and apply the parameters that optimize the performance to the interface.

Example 15 includes the at least one tangible machine readable storage medium as of example 14, wherein the particle swarm optimization algorithm optimizes the parameters based on a voltage margin, a phase margin, and a bit error rate.

Example 16 includes the at least one tangible machine readable storage medium of any one of examples 14-15, further including storing the parameters that optimize the performance to a memory.

Example 17 includes the at least one tangible machine readable storage medium of any one of examples 14-16, wherein the determination of whether to perform the parameter optimization is based on an instruction stored in memory.

Example 18 includes the at least one tangible machine readable storage medium of example 17, wherein the instruction is stored based on an input received from a user.

Example 19 includes the at least one tangible machine readable storage medium of any one of examples 14-18, wherein the determination of whether to perform the parameter optimization includes validating the parameters stored in a memory.

Example 20 includes the at least one tangible machine readable storage medium of any one of examples 14-19, wherein the parameters that optimize the performance are applied to the interface by writing the parameters to a register of the interface.

Example 21 includes an apparatus to configure parameters of an input-output interface, the apparatus comprising means for determining, in response to a system initialization, whether to perform parameter optimization for an interface, means for searching, in response to the determination to perform the parameter optimization, for parameters that optimize performance of the interface using a particle swarm optimization algorithm, and means for applying the parameters that optimize the performance to the high-speed input-output interface.

Example 22 includes the apparatus as of example 21, wherein the means for controlling is to optimize the parameters based on a voltage margin, a phase margin, and a bit error rate read from the interface.

Example 23 includes the apparatus of any one of examples 21-22 wherein the means for controlling is further to store the parameters that optimize the performance to a memory.

Example 24 includes the apparatus of any one of examples 21-23, wherein the determination of whether to perform the parameter optimization is based on an instruction stored in a memory, the instruction stored in the memory based on an input received from a user.

Example 25 includes the apparatus of any one of examples 21-24, wherein the determination of whether to perform the parameter optimization includes validating the parameters stored in a memory.

Example 26 includes the apparatus of any one of examples 21-25, wherein the means for controlling is to write the parameters that optimize the performance to a register of the interface.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to configure parameters of an input-output interface, the apparatus comprising:
   a boot controller to determine, in response to a system initialization, whether to perform parameter optimization for the input-output interface; and
   a controller to, in response to the determination to perform the parameter optimization, execute a particle swarm optimization algorithm to search for High Speed Input-Output (HSIO) parameters of the input-output interface that optimize an objective score representing a performance of the interface, and apply the parameters to the input-output interface that optimize the performance to the interface, the parameters including a gain value used to communicate via the input-output interface.

2. The apparatus as of claim 1, wherein the controller is to optimize the parameters based on a voltage margin, a phase margin, and a bit error rate read from the input-output interface.

3. The apparatus of claim 1, wherein the controller is further to store the parameters to a memory.

4. The apparatus of claim 1, wherein the boot controller is to determine whether to perform the parameter optimization based on an instruction stored in a memory, the instruction stored in the memory based on an input from a user.

5. The apparatus of claim 1, wherein the boot controller is to determine whether to perform the parameter optimization in response to a validation of the parameters stored in a memory.

6. The apparatus of claim 1, wherein the controller is to write the parameters that optimize the performance to a register of the input-output interface.

7. A method for configuring parameters of an input-output interface, the method comprising:

determining, by executing an instruction with a processor and in response to a system initialization, whether to perform parameter optimization for the input-output interface;

in response to the determination to perform the parameter optimization, executing a particle swarm optimization algorithm, by executing an instruction with the processor, to search for High Speed Input-Output (HSIO) parameters that optimize an objective score representing a performance of the input-output interface, the parameters including a gain value used to communicate via the input-output interface; and applying the parameters that optimize the performance to the input-output interface.

8. The method as of claim 7, wherein the particle swarm optimization algorithm optimizes the parameters based on a voltage margin, a phase margin, and a bit error rate.

9. The method of claim 7, further including storing the parameters to a memory.

10. The method of claim 7, wherein the determining of whether to perform the parameter optimization is based on an instruction stored in memory.

11. The method of claim 10, wherein the instruction is stored based on an input from a user.

12. The method of claim 7, wherein the determining of whether to perform the parameter optimization includes validating the parameters stored in a memory.

13. The method of claim 7, wherein the parameters are applied to the input-output interface by writing the parameters to a register of the input-output interface.

14. At least one tangible computer readable storage medium comprising instructions which, when executed, cause a processor to at least:

determine, in response to a system initialization, whether to perform parameter optimization for an input-output interface;

in response to the determination to perform the parameter optimization, execute a particle swarm optimization algorithm to search for High Speed Input-Output (HSIO) parameters that optimize an objective score representing a performance of the input-output interface, the parameters including a gain value used to communicate via the input-output interface; and apply the parameters that optimize the performance to the input-output interface.

15. The at least one tangible computer readable storage medium of claim 14, wherein the particle swarm optimization algorithm is to optimize the parameters based on a voltage margin, a phase margin, and a bit error rate.

16. The at least one tangible computer readable storage medium of claim 14, wherein the instructions cause the processor to store the parameters to a memory.

17. The at least one tangible computer readable storage medium of claim 14, wherein the instructions cause the processor to determine whether to perform the parameter optimization based on an executable instruction stored in memory.

18. The at least one tangible computer readable storage medium of claim 17, wherein the executable instruction is stored based on an input from a user.

19. The at least one tangible computer readable storage medium of claim 14, wherein the instructions cause the processor to determine whether to perform the parameter optimization by validating the parameters stored in a memory.

20. The at least one tangible computer readable storage medium of claim 14, wherein the instructions cause the processor to apply the parameters that optimize the performance to the interface by writing the parameters to a register of the input-output interface.

* * * * *